United States Patent [19]

Rainey, Jr.

[11] Patent Number: 4,494,878

[45] Date of Patent: Jan. 22, 1985

[54] FASTENER-FREE BAFFLE ASSEMBLY SYSTEM

[75] Inventor: Charles E. Rainey, Jr., North Richland Hills, Tex.

[73] Assignee: Graham Magnetics Incorporated, North Richland Hills, Tex.

[21] Appl. No.: 513,770

[22] Filed: Jul. 14, 1983

[51] Int. Cl.[3] ........................... B01F 7/00; B01J 14/00

[52] U.S. Cl. ....................................... 366/341; 138/40; 366/306; 366/307; 366/336; 422/135; 422/224

[58] Field of Search ............... 366/336, 302, 337, 303, 366/338, 307, 339, 340, 341, 281, 279, 57, 228-231, 306; 138/37, 44, 40, 42; 422/133-135, 224

[56] References Cited

U.S. PATENT DOCUMENTS 4,313,680 2/1982 Honnen .............................. 366/337

*Primary Examiner*—Timothy F. Simone
*Attorney, Agent, or Firm*—Andrew F. Kehoe

[57] ABSTRACT

A quickly and easily assembled, fastener-free baffle system for use with agitated reaction vessels. The novel baffle system is characterized by its ability to be disassembled into easily-cleanable parts, its lack of independent fastening means such as screws, welds, rivets, etc. and the easy interchangeability of its parts.

11 Claims, 4 Drawing Figures

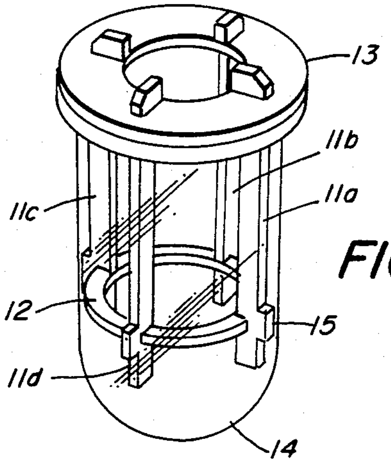
FIG. 1
FIG. 3
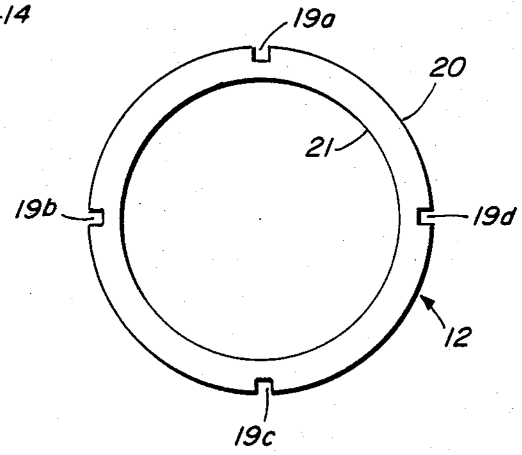
FIG. 2
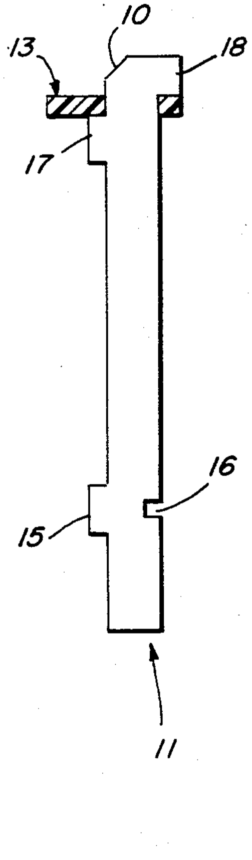
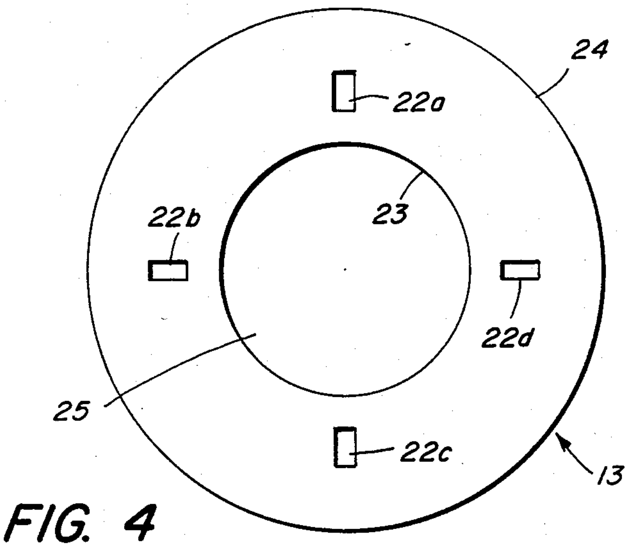
FIG. 4

FASTENER-FREE BAFFLE ASSEMBLY SYSTEM

BACKGROUND OF THE INVENTION

This invention relates to a fastener-free baffle assembly system to be used to enhance the mixing process in an agitated reaction vessel.

Chemical reaction vessel are often equipped with either internal or external mixing devices. However, such a device, by itself, is not sufficient to provide adequate mixing during most chemical reactions. Often a baffle system is added to the reactor to disrupt the flow of liquid, resulting in a more complete mixture of the reactants. Usually the baffle system is selected to complement the particular mode of agitation.

Such baffle systems are well known in the art. However, most earlier baffle systems have parts which are attached to one another by screws, welds, or similar fastening methods independent of the baffle system itself. In turn, the system is attached to the reactor wall. These designs result in difficult and incomplete cleaning, little flexibility in the choice of baffle construction material and difficult assembly or disassembly of the system.

Thus there has been a need for a more convenient design of a baffle system.

SUMMARY OF THE INVENTION

Therefore, it is a principle object of this invention to provide a fastener-free laboratory scale baffle system for use in an agitated reaction vessel constructed to allow quick disassembly for easy and more complete cleaning.

Another object of this invention is to provide a baffle system designed to be easily and completely disassembled for more convenient storage or shipping.

A further object of this invention is to provide a baffle assembly system constructed in such a manner as to allow for the easy replacement of damaged or broken baffle system members.

Another object of this invention is to provide a baffle system design which will allow the user to easily and economically interchange parts to accommodate reaction vessels of different shapes or sizes and especially to accommodate agitation systems suitable for mixtures of higher or lower viscosity.

Still another object of this invention is to allow the designer/user of a baffle system greater flexibility in the choice of material to be used in the construction of the baffle system.

Other objects of this invention will be obvious to those skilled in the art upon reading this disclosure.

The above objects have been achieved by providing a novel fastener-free baffle assembly system which comprises (1) a disc-shaped support means having a circular opening in its center; (2) a ring-shaped stabilizing means of lesser diameter than the support means; and (3) a plurality of baffles which interlock, free of independent fastening means, with both the support and stabilizing means. In the preferred embodiment of the invention the assembled baffle system is inserted into an agitated reaction vessel and is secured by the action of the support means resting on top of the reaction vessel. Additional support for the system is provided by the force of protruding tabs, on the top and bottom of each baffle, as they lie flush with the inside wall of the reaction vessel.

The removability of the baffles is important for good cleaning and convenient storage. However, it also makes the apparatus more versatile.

When more viscous systems are to be agitated, the number of baffles can be readily reduced to one or two, thereby matching the baffle requirements to the power capabilities of the agitator and the flow properties of the liquid.

Also baffles of different shapes or apertured baffles may be used in order to meet the requirements of a particular agitation system, to aid in the disagglomeration of precipitating particles, or to meet other special needs of a particular process.

It is also desirable to have sufficient play in the connection of the baffles, to the supporting and stabilizing members, so that a small angular rotation of the support ring will allow the baffles to be angled slightly from the perpendicular to achieve special baffle effects. It facilitates this function to have the baffles made out of a material such as a plastic. Fluorinated hydrocarbon polymers such as that sold under the trademark Teflon by DuPont are preferred materials of construction.

Another important aspect of the invention is the fact that preferred embodiments of the baffle system can be readily removed from a reaction system by remotely-controlled robot means.

IN THE DRAWINGS

FIG. 1 is a side view drawing of the assembled baffle system as it would normally be used in a reaction vessel.

FIG. 2 is a side view of the baffle design to be used with this invention.

FIG. 3 is a top view of a stabilizing ring to be used with this invention.

FIG. 4 is a top view of a support ring to be used with this baffled assembly system Referring to FIG. 1 it is seen that the support ring 13 rests on the top, outside rim of the reaction vessel, thereby forming a gasket or gasket-support means while the stabilizing ring 12 and the baffles 11*a–d* are placed inside the reaction vessel 14. Also, the protruding bottom tabs 15 and the protruding upper tabs 17 of each baffle are flush with the inside wall of the reaction vessel.

Referring to FIG. 2 it is seen that a baffle 11 is a substantially rectangular piece which, at its lower portion, contains an outwardly protruding rectangle tab 15 on its exterior wall and a relatively small rectangular indentation 16 on its interior wall. The upper portion of the baffle's exterior wall has an outwardly protruding rectangular tab 17 while the top of the baffle is angled at 10 and has an inward rectangular protrusion 18. Tabs 15 and 17 form means to space the major portions of the baffle from reactor walls.

Referring to FIG. 3 it is seen that the stabilizing ring 12 is substantially hoop-shaped, having an exterior wall 20 which is partially penetrated by a plurality of indentations 19*a–d*. The interior wall 21 of the stabilizing ring is smooth.

Referring of FIG. 4 it is seen that the support ring 13 is substantially disc-shaped with a circular opening 25 in the center and a plurality of rectangular slots 22*a–d* which completely penetrate its surface. Both the inner wall 23 and the outer wall 24 of the support ring are smooth.

Assembly of the baffle system is accomplished by firmly holding the support ring 13 in one hand while inserting the top, angled portion of each baffle 11 through a slot 22 in the support ring so that the top rectangular protrusion 18 is pointing toward the opening 25 in the support ring. When this is done properly the outside edge of the top protrusion 18 of each baffle will be flush with the inside wall 23 of the support ring. Also, the lower surface of the support ring should rest on top of the upper edge of the baffles outwardly protruding support tabs 17. After anchoring each baffle, in the support ring 13 as described above, the stabilizing ring 12 is interlocked with the bottom end of the baffle 11 by inserting the stabilizing rings' indentations 19*a–d* into the indentations 6*a–d* of the baffle. When each baffle is attached in this manner the baffle system will be fully assembled and ready for use in an agitated reaction vessel.

An advantage of this invention is that the user may select a number of stabilizing rings, support rings and baffles, of different sizes, to best suit his needs.

It is to be understood that the following claims are intended to cover all of the generic and specific features of the invention herein described and all statements of the scope of the invention which might be said to fall there between.

I claim:

1. A removable, fastener-free, baffle assembly for use with agitated vessels, said baffle assembly comprising:

(a) an upper support member adapted to rest upon the upper surface of the mouth of said vessel, (b) a plurality of baffle members forming a fastener-free interlock with said upper support member, and depending therefrom (c) a lower stabilizing ring forming a fastener-free interlock with said baffle members at a point along the lower half of said members and along the interior sides of said members.

2. A baffle assembly as defined in claim 1, wherein a plurality of said baffles comprise spacer means along the exterior portion thereof to bear against an interior wall of a reactor and aid in spacing said baffle from said wall of reactor.

3. A baffle system as defined in claim 1 wherein said spacer means are on the opposite sides of a baffle from their connection to said stabilizing ring.

4. Apparatus as defined in claim 1 wherein said upper support member forms a gasketing means.

5. A fastener-free, baffle-bearing assembly system for containment within a vessel of an agitated reactor system comprising:

(a) a flange support ring, forming means to rest on top of a reaction vessel, said support ring forming means to hold and space downwardly-depending baffles;

(b) a ring-shaped baffle-stabilizing means, which comprises spaced slots to form a fastener-free interlock means with said baffles and, when interlocked therewith, stabilizes said baffles against motion;

(c) said baffles being arranged as a plurality of elongate of baffles, substantially normal to said flange ring and said stabilizing means, and each baffle comprising slot means to form a quick-disconnecting, fastener-free interlock with said slots of said stabilizing means at a position on said baffles closer to the bottom of said baffles than to said flange support ring.

6. A system as defined in claim 5 wherein a support ring forms gasket means.

7. A system as defined in claim 5 wherein said means to hold and space said baffles on said support ring a plurality of slots forming means to facilitate a fastener-free interlock with the baffles.

8. A system as defined in claim 5 wherein said stabilizing means is a substantially ring-shaped member which is attached proximate to the bottom portion of said baffles and forms means to position an outwardly-protruding tab of each baffle to bear against an interior wall of a vessel.

9. A system as defined in claim 8 wherein said stabilizing ring comprises an outside edge which contains a plurality of indentations to facilitate fastener-free interlock with said baffles.

10. A system as defined in claim 5 wherein said baffles are elongate, substantially rectangular members comprising:

(a) inwardly-protruding tab at the top of said baffle to facilitate a fastener-free interlock with slots of the said support means;

(b) a substantially rectangular protrusion on the outside edge of said baffles, just below said tab, forming means for maintaining a fastener-free interlock with said support means at the top of said baffles;

(c) an inwardly and upwardly tapered top perimeter portion at the outward side of said baffles said tapered perimeter forming means to allow said support means to be placed over said baffle to rest on said support and below said tab;

(d) a substantially rectangular indentation at an interior edge of a bottom portion of the baffle to facilitate fastener-free interlocking of the baffle with said stabilizing means;

(e) a substantially rectangular protrusion on the exterior edges of said baffles, opposite said indentation, to facilitate fastener-free interlock of said baffle at a point on said stabilizing means where a mating indentation.

11. A device as defined in claim 5 wherein protruding tabs on the upper outside edges of said baffles, when attached to a support means and inserted into a reaction vessel, is adapted to be flush with an inside wall of a reaction vessel.

* * * * *

UNITED STATES PATENT AND TRADEMARK OFFICE
CERTIFICATE OF CORRECTION

PATENT NO. : 4,494,878

DATED : January 22, 1985

INVENTOR(S) : Charles E. Rainey, Jr.

It is certified that error appears in the above-identified patent and that said Letters Patent are hereby corrected as shown below:

Col. 3, line 42 change "1" to --2--.

Signed and Sealed this

*Eleventh* Day of *June 1985*

[SEAL]

*Attest:*

DONALD J. QUIGG

*Attesting Officer* *Acting Commissioner of Patents and Trademarks*